Oct. 21, 1969  K. D. RICHMOND  3,473,989
METHOD OF MAKING A TRANSMISSION TOOTHED BELT
Original Filed June 29, 1965  2 Sheets-Sheet 1
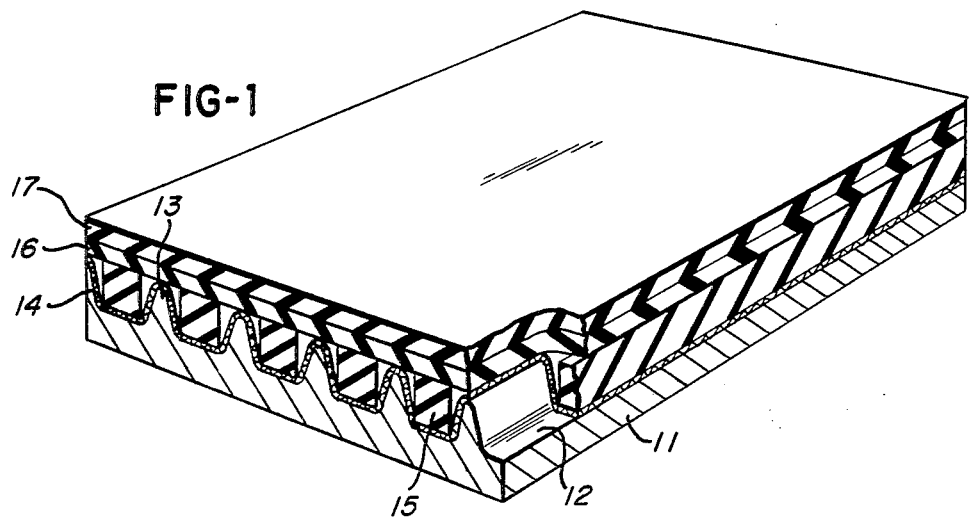
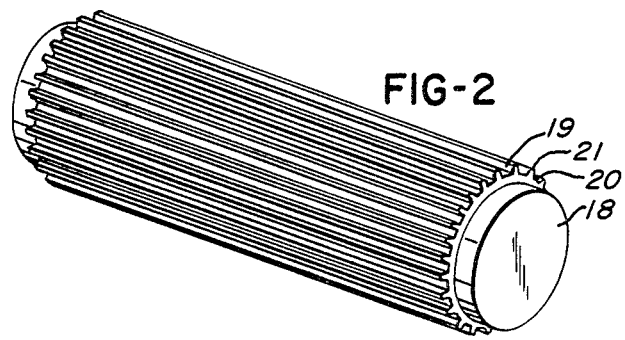
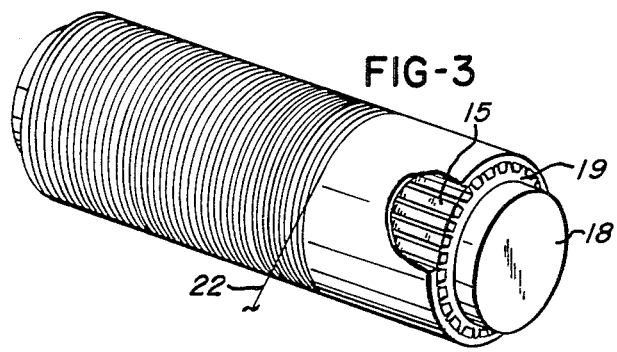
INVENTOR.
KENNETH D. RICHMOND
BY
ATTORNEY Oct. 21, 1969   K. D. RICHMOND   3,473,989
METHOD OF MAKING A TRANSMISSION TOOTHED BELT
Original Filed June 29, 1965   2 Sheets-Sheet 2
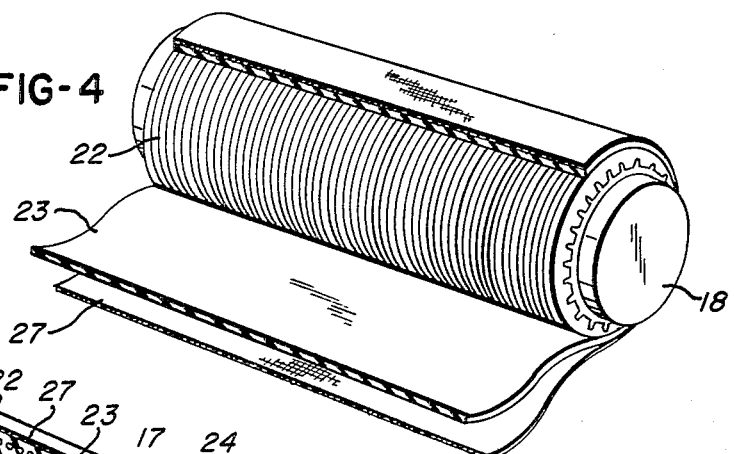
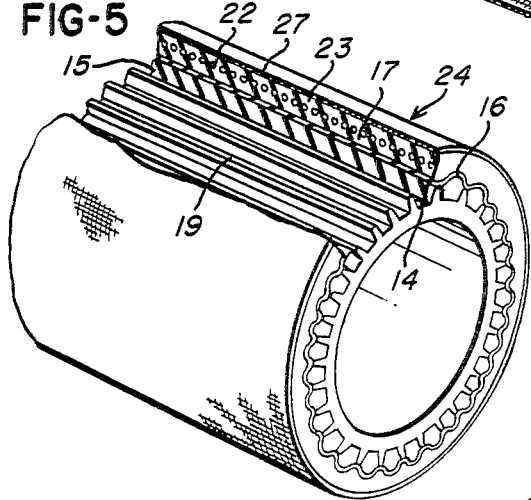
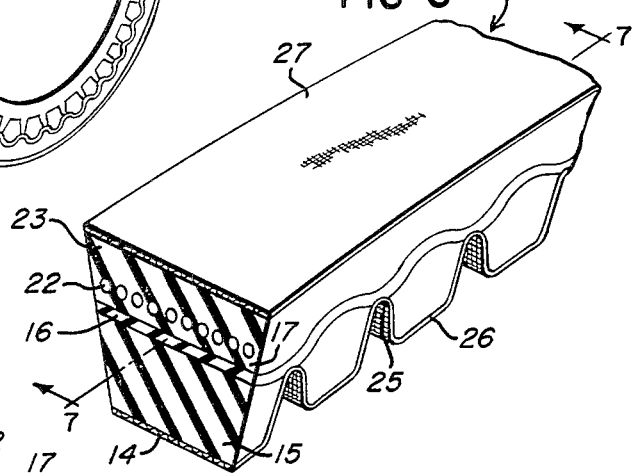
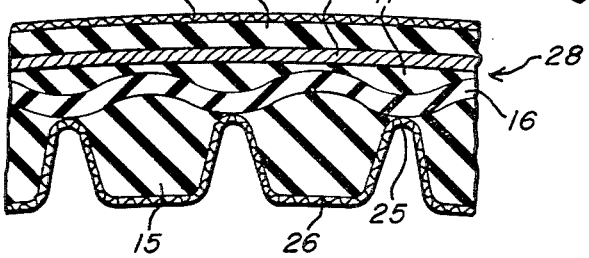
INVENTOR.
KENNETH D. RICHMOND
BY
Reuben Wolk
ATTORNEY United States Patent Office 3,473,989
Patented Oct. 21, 1969

3,473,989
METHOD OF MAKING A TRANSMISSION TOOTHED BELT
Kenneth D. Richmond, Nixa, Mo., assignor to Dayco Corporation, Dayton, Ohio, a corporation of Ohio
Original application June 29, 1965, Ser. No. 467,890, now Patent No. 3,353,419, dated Nov. 21, 1967. Divided and this application Mar. 27, 1967, Ser. No. 656,960
Int. Cl. F16g 5/22
U.S. Cl. 156—138                    1 Claim

ABSTRACT OF THE DISCLOSURE

A method of manufacturing V-type belts with transverse teeth and grooves to minimize the formation of cracks. This is accomplished by placing a soft rubber layer outward of the teeth which is subsequently formed into a longitudinally undulating configuration during vulcanization.

---

This application is a division of U.S. application Ser. No. 467,890, filed June 29, 1965, now Patent No. 3,353,419.

This invention relates to a transmission belt and method of manufacture, and particularly to the type of belt having a trapezoidal cross section and referred to as a V-belt. One type of transmission belt having a wide usage is a toothed belt which provides improved flexbility in a drive system. The present invention relates to an improved version of a belt of this type.

In order to improve the flexibility of the toothed belt applicant has found that the use of a soft layer of rubber material just outward of the teeth will accomplish this purpose and at the same time will tend to eliminate cracking. One attempt in this direction was made in United States Patent No. 2,945,389 in which a soft layer was formed in a belt, and subsequently the teeth were cut into the inner surface of the belt and into the soft layer. However, the present invention contemplates a considerable improvement over this device, since the teeth are preformed and the soft layer of material has an undulating configuration and extends above the teeth at a different level than at the grooves between the teeth. In adidtion, the present invention contemplates the use of a different material for the teeth, which material is harder than the remainder of the belt, in order to provide a more favorable relationship with the soft crack-resistant section. During the molding process the teeth, which are harder, will force their way outward into the softer gum section to create the undulated layer referred to. This soft material then will extend at an angle of approximately 30 degrees with the axis of the belt and will tend to resist the cracks which normally form at the root of the grooves; while these cracks are vertical under a nonload condition, the increase of loading on the belt causes the cracks to extend outwardly at a different angle. The purpose of the undulating soft layer is to absorb the load on the cracks so that they will not spread through the remainder of the belt, but will be dampened out.

It is a principal object of this invention therefore to manufacture a toothed belt which is highly resistant to cracks.

It is a further object of the invention to provide such a belt which will increase the flexibility.

It is a further object of the invention to provide a method of manufacturing such belts.

These and other objects of the invention will be readily apparent in the following specification, claim, and drawings, in which:

FIGURE 1 is a perspective view in partial section of a first step in building the compression section of the novel belt.

FIGURE 2 is a perspective view of a typical mandrel and matrix upon which the compression section of the belt is placed.

FIGURE 3 is a perspective view illustrating a further step in the manufacture of the novel belt.

FIGURE 4 is a perspective view illustrating still another step.

FIGURE 5 is a perspective view in partial section illustrating a segment of the complete assembled belt on the building mandrel.

FIGURE 6 is a perspective view in section of the completed belt.

FIGURE 7 is a sectional view taken along lines 7—7 of FIGURE 6.

Referring now to the drawings, the compression section of a toothed belt may be fabricated as shown in FIGURE 1 by the use of a steel plate 11 having a series of grooves 12 separated by ridges 13 extending in a longitudinal direction. It should be understood that the plate shown in FIGURE 1 is only a portion thereof and may be made in any dimensions desired to provide the necessary compression section. As a first step, a conventional bias-woven cover fabric 14 is laid in the grooves, this fabric preferably being rubber impregnated. This fabric may be forced tightly into the grooves by the use of a toothed roller or other conventional means. Into these fabric-covered grooves is placed the material which forms the teeth, and this material consists of a series of strips of rubber 15 having a hardness of about 80 to 90 Shore A durometer and a rectangular cross section as shown. These strips are simply placed in the cover material 14. The next step in the construction consists of laying a strip of soft rubber material 16 having a Shore A durometer hardness of about 50 to 60 over the entire assembly. Upon this layer 16 is then laid another rubber layer 17 which has a Shore A durometer hardness of about 80 to 90, approximately equal to that of the teeth. This entire assembly then forms the compression section which is removed from the plate 11 and wrapped around the mandrel 18 which is shown in FIGURE 2. The mandrel 18 has a cured rubber matrix 19 which has been previously fabricated and wrapped around the mandrel around the mandrel and has a series of longitudinally extending grooves 20 and teeth 21 which exactly match the grooves and teeth of the plate 11. When the compression section is wrapped around this mandrel, the teeth will coincide exactly with the grooves 20 of the matrix 19 as shown in FIGURE 3.

The next step of the manufacture consists of spinning a strength cord 22 about the drum in a conventional manner as shown in FIGURE 3, and this in turn is followed by the placing of a rubber tension section 23 and an outer cover fabric 27 about the cord as shown in FIGURE 4. The entire assembly is then ready for molding under heat and pressure in a conventional manner to which heat and pressure are applied. During this process the harder teeth 15 have resisted flowing as much as the softer materials, so that relative to the softer layer, they may be said to have forced their way outward into the softer layer 16 which does flow under the heat, thereby creating the undulating effect shown in FIGURES 5–7. The completed sleeve, designated by reference numeral 24 and shown in FIGURE 5, is removed from the mandrel and cut by means of conventional belt cutters into individual belts 28, which now consist of the outer cover 27, tension section 23, strength cords 22, the soft gum layer 16, the teeth 15, and the inner cover 14, as shown in FIGURES 6 and 7. The matrix 19 has maintained the proper shape of the teeth 26 and the grooves 25 in the finished belt. As can be seen, the soft gum rubber now has the undulated shape referred to and extends to the roots of the grooves 25 at the innermost points thereof, by extending above the original teeth at the outermost points thereof. It is this arrangement which tends to absorb the cracks which form at the roots and avoid any tendency of these cracks to spread throughout the remainder of the belt.

As used throughout this application, the term "rubber" is meant to include natural rubber as well as the various synthetic rubber materials such as butadiene-styrene copolymers, butadiene-acrylonitrile copolymers, polychloroprene, and the like.

The above method of assembling the belt is only one of many which may be used to create the finished product, but other methods may be used to achieve the same results. For instance, it is well known to build toothed belts in an inside-out manner, and this may also be used to achieve the identical results. The principal concept of the present invention; namely, the use of a softer undulatedl gum layer to eliminate cracks will apply regardless of the specific method of manufacture which is used.

I claim:

1. A method of manufacturing an endless V-type transmission belt including an inner surface of alternating transverse teeth and grooves comprising the steps of; making a preformed toothed compression section of the belt by assembling a plurality of strips of hard rubber within the grooves of a grooved mold plate, applying a layer of soft rubber over said strips, and applying a layer of hard rubber over said soft rubber layer; removing the compression section from the plate and wrapping said section about a grooved mandrel to form said section into an annular member; successively wrapping a strength cord and tension section around said compression section to form a belt sleeve; and applying heat and pressure to vulcanize said sleeve to form a belt while simultaneously forcing said strips outwardly into said soft rubber layer and forming an undulating configuration in said soft rubber layer.

References Cited

UNITED STATES PATENTS

| | | | |
|---|---|---|---|
| 3,250,653 | 5/1966 | Geist et al. | 156—138 |
| 1,729,329 | 9/1929 | Chilton | 156—140 |
| 2,773,540 | 12/1956 | Waugh | 156—138 |
| 2,337,985 | 12/1943 | Freedlander | 156—138 |
| 1,510,449 | 9/1924 | Brucker | 156—138 |

HAROLD ANSHER, Primary Examiner

PHILIP DIER, Assistant Examiner

U.S. Cl. X.R.

74—233; 156—140, 171, 213, 242, 250; 264—227, 248